2,876,245
Patented Mar. 3, 1959

2,876,245
PRODUCTION OF HETEROCYCLIC DITHIOPHOSPHATE KETOESTERS

William M. Lanham, Charleston, W. Va., assignor to Union Carbide Corporation, a corporation of New York No Drawing. Application July 1, 1955
Serial No. 519,680

6 Claims. (Cl. 260—461)

This invention relates to the production of a novel class of keto-esters of heterocyclic dithiophosphoric acids containing phosphorus in the heterocyclic ring. More especially it concerns the production of novel keto-esters having structures corresponding to the formula

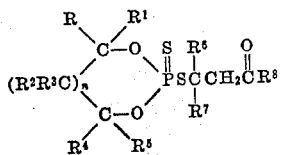

wherein R, $R^1$, $R^2$, $R^3$, $R^4$ and $R^5$, respectively, designates a member of the class consisting of hydrogen and the alkyl radicals, preferably those having 1 to 20 carbon atoms; $R^6$ and $R^7$, respectively, designates a member of the class consisting of hydrogen and the alkyl, aryl, aralkyl and alkaryl radicals; $R^8$ designates a radical of the class consisting of the alkyl, aryl, aralkyl, alkaryl, and the

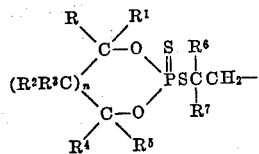

radicals; and $n$ is of the class consisting of 0 and 1.

The novel keto-esters of the invention are useful as insecticides, fungicides, plasticizers, corrosion inhibitors, flotation agents and petroleum additives.

The novel compounds of the invention can be produced by reacting a heterocyclic dithiophosphoric acid of the formula

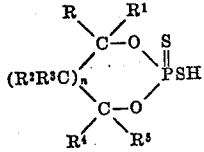

wherein R and $R^1$ to $R^5$ and $n$ have the meanings hereinbefore indicated, with an alpha, beta-olefinically unsaturated ketone, and particularly a vinyl, or a hydrocarbon-substituted vinyl ketone having a structure represented by the formula

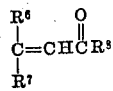

wherein $R^6$ and $R^7$, respectively, have the meanings hereinbefore indicated; and $R^8$ is a member of the class consisting of the alkyl, aryl, aralkyl, alkaryl, vinyl and the β-monoalkylvinyl and the β,β-dialkylvinyl radicals.

The reaction can be conducted at temperatures within the range from about −20° C. to about 150° C., but temperatures within the range from 25° C. to 100° C. are preferred to avoid product losses by decomposition with loss of hydrogen sulfide. While usually one of the reactants is fed dropwise in small successive portions to a solution or suspension of the other reactant in an inert solvent or diluent, the two reactants may be mixed together at the outset in molar ratios of from 0.25:1 to 3:1 of the unsaturated ketone reactant to the phosphorus-containing reactant.

If desired the reaction can be conducted in the presence as catalyst of an aliphatic tertiary amine such as triethylamine, or an anhydrous alkali metal hydroxide or carbonate, although the use of a catalyst is not necessary. When the unsaturated ketone reactant is highly reactive a polymerization inhibitor such as hydroquinone preferably is used.

The reaction usually is conducted in the presence of an inert solvent, particularly when one or both of the reactants are solids. Useful solvents include saturated esters of the fatty acid series such as ethyl acetate, amyl acetate, methyl propionate, and the methyl and ethyl butyrates; ketones such as acetone and methyl isobutyl ketone; ethers such as dioxane; aromatic compounds such as benzene, toluene, the xylenes, and nitrobenzene; and chlorinated solvents such as carbon tetrachloride, chloroform and chlorobenzene.

The novel products of the invention can be recovered from the reaction mixture by fractionally distilling the latter under high vacuum to remove any unreacted starting material, solvent and by-products. Preferably, however, the reaction mixture is first washed with a dilute aqueous solution of sodium bicarbonate or the equivalent, washed with water, and the washed product stripped of unreacted materials and solvent by distillation under high vacuum. The desired product is recovered in good purity as a still residue.

Among unsaturated ketones useful in the process may be mentioned methyl vinyl ketone, ethyl vinyl ketone, butyl vinyl ketone, decyl vinyl ketone, octadecyl vinyl ketone, phenyl vinyl ketone, benzyl vinyl ketone, tolyl vinyl ketone, methyl 2-phenylvinyl ketone (benzalacetone), phenyl 2-phenylvinyl ketone (benzalacetophenone), methyl 2,2-dimethylvinyl ketone (mesityl oxide), divinyl ketone, bis-(2-methylvinyl) ketone, bis-(2,2-dimethylvinyl) ketone (phorone), tolyl vinyl ketone, benzyl vinyl ketone, phenyl 2-benzylvinyl ketone, phenyl 2-tolylvinyl ketone, 3,7-dimethyl-3-octene-2-one, methyl 2-methylvinylketone, 1-methylbenzylidenemethyl phenyl ketone, ethyl 2-methylvinyl ketone, isobutenyl propyl ketone, isopropylideneacetone, isobutylideneacetone, and methyl isopropenyl ketone.

The following equation illustrates the nature of the reaction involved in one form of the invention:

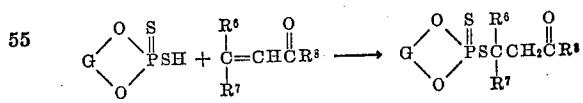

wherein G represents a hydrocarbon radical of the formula —$CRR^1(CR^2R^3)_nCR^4R^5$—, and wherein R, $R^1$, $R^2$, $R^3$, $R^4$ and $R^5$, respectively, designates a member of the class consisting of hydrogen and the alkyl groups, and $n$ is 0 or 1. To illustrate the invention further, by reacting a compound of the formula

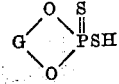

with the following α,β-unsaturated ketones, compounds indicated in the table are produced.

TABLE

| Unsaturated ketone | Product |
|---|---|
| decyl vinyl ketone | ![structure] G⟨O/O⟩P(S)SCH₂CH₂C(O)C₁₀H₂₁ |
| benzyl vinyl ketone | G⟨O/O⟩P(S)SCH₂CH₂C(O)CH₂C₆H₅ |
| methyl 2-phenylvinyl ketone | G⟨O/O⟩P(S)SCH(C₆H₅)CH₂C(O)CH₃ |
| divinyl ketone | G⟨O/O⟩P(S)SCH₂CH₂C(O)CH₂CH₂SP(S)⟨O/O⟩G |
| phenyl 2-tolylvinyl ketone | G⟨O/O⟩P(S)SCH(C₆H₄CH₃)CH₂C(O)C₆H₅ |
| ethyl 2-phenylvinyl ketone | G⟨O/O⟩P(S)SCH(C₆H₅)CH₂C(O)C₂H₅ |
| methyl 2,2-dimethylvinyl ketone | G⟨O/O⟩P(S)SC(CH₃)₂CH₂C(O)CH₃ |
| phorone | G⟨O/O⟩PS–C(CH₃)₂CH₂C(O)CH₂C(CH₃)₂SP(S)⟨O/O⟩G |

The heterocyclic dithiophosphoric acid starting materials can be produced by reacting phosphorus pentasulfide with an alkane-1,2-diol or an alkane-1,3-diol at temperatures within the range from 25° C. to 100° C. and above, preferably in the presence of an inert solvent for the diol and reaction products, and removing the by-product hydrogen sulfide as it is formed. Such a process is described in my pending application, Serial No. 387,064, filed October 19, 1953.

The following examples serve to illustrate the invention:

Example 1

To an agitated solution of 34 grams (0.23 mol) of benzalacetone in 75 grams of benzene during 5 minutes there were added dropwise 60 grams (0.25 mol) of 5-ethyl-2-mercapto-4-propyl - 2 - thiono - 1,3,2 - dioxaphosphorinane while maintaining the mixture at 25° C. After an additional 20 hours at 25° C. the reaction mixture was freed of the excess dithiophosphoric acid by washing with excess concentrated aqueous sodium bicarbonate, and then with water until neutral toward litmus paper, dried over calcium sulfate, filtered, and the filtrate stripped by distillation to a kettle temperature of 50° C. under less than 2 mm. of mercury pressure. There was thus secured 79 grams of 2-(2-acetyl-1-phenylethylmercapto)-5-ethyl-4-propyl-2-thiono - 1,3,2 - dioxaphosphorinane in the form of an orange, viscous liquid residue having the following properties: $n_D^{30}=1.5600$; acidity=0.04 cc. of N KOH/gram; salt=nil; analysis, percent by weight: P=7.94 (theory=8.02); S=16.36 (theory=16.59); C=56.49 (theory=55.98); H=7.15 (theory=7.05); percent yield=88 (based upon the benzalacetone).

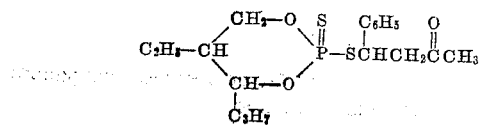

Example 2

To an agitated solution of 75 grams (0.33 mol) of 5,5-diethyl - 2 - mercapto - 2 - thiono - 1,3,2 - dioxaphosphorinane in 150 grams of toluene held at 37° C. there were added during 10 minutes a solution of 21 grams (0.152 mol) of phorone in 25 grams of toluene. After standing for about 20 hours at 25° C., the reaction mixture was neutralized with sodium bicarbonate, washed, dried and filtered, in the manner described in Example 1. The filtrate was stripped by distillation to a kettle temperature of 100° C. under less than 2 mm. of mercury, yielding the bis-(5,5-diethyl-2-mercapto-2-thiono-1,3,2-dioxaphosphorinane) adduct of phorone as a viscous residue having the following properties: $n_D^{30}=1.5532$; acidity=0.01 cc. of N KOH/gram; salt=0.005 cc. of N HClO₄/gram; analysis, percent by weight: P=10.39 (theory=10.48); S=20.6 (theory=21.70); C=47.44 (theory=46.78); H=7.67 (theory=7.50); percent yield=79 (based on the phorone).

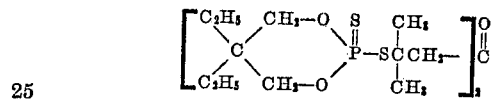

Example 3

2-(2 - benzoyl - 1 - phenylethylmercapto) - 5 - ethyl-4-propyl-2-thiono-1,3,2-dioxaphosphorinane was prepared by the dropwise addition of 48 grams (0.2 mol) of 5-ethyl-2-mercapto - 4 - propyl - 2 - thiono-1,3,2-dioxaphosphorinane into an agitated solution of 37.5 grams (0.18 mol) of benzalacetophenone in 75 grams of benzene over a period of 5 minutes. It was necessary to cool the reaction mixture throughout this addition in order to maintain the kettle temperature at 25° C. After the addition the reaction mixture was agitated at 25° C. for 4 hours, allowed to stand overnight at 25° C., neutralized using concentrated aqueous sodium bicarbonate, washed twice with water, dried over calcium sulfate, filtered, and the filtrate stripped by distillation to a kettle temperature of 50° C. under less than 2 mm. of mercury. The resulting 71 grams of residue, a wax-like solid, was agitated in 400 cc. of ethyl ether and filtered at 25° C. to give 12 grams of white solid residue, which had the following properties: melting point=133°–135° C.; analysis, percent by weight: P=7.11 (theory=6.91); S=14.30 (theory=14.30); C=61.58 (theory=61.62); H=6.47 (theory=6.52).

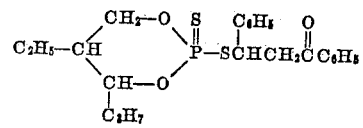

Example 4

To an agitated solution of 9 grams (0.062 mol) of banzalacetone in 75 grams of benzene maintained at 25° C. there were added during 10 minutes 15 grams (0.071 mol) of 2-mercapto-4,4,5,5-tetramethyl-2-thiono-1,3,2-dioxaphospholane. After an additional 50 hours at 25° C. the reaction mixture was neutralized with concentrated aqueous sodium bicarbonate, washed with water, dried over calcium sulfate, filtered, and the filtrate stripped by distillation to a kettle temperature of 35° C. under less than 20 mm. of mercury pressure. The still residue was agitated in 300 cc. of ethyl ether, cooled to −25° C. and filtered cold, and the ether-insoluble product air-dried. There was thus secured in 64% yield (based on the benzalacetone) 2-(2-acetyl-1-phenylethylmercapto) - 4,4,5,5 - tetramethyl - 2 - thiono - 1,3,2 - dioxaphospholane as a fluffy gray solid residue having the following properties: melting point=105°–106° C.; acidity=0.004 cc. of N KOH/gram; salt= 0.001 cc. of N HClO₄/gram; analysis, percent by weight: P=8.87

(theory=8.64); S=18.0 (theory=17.89); C=53.71 (theory=53.61); H=6.33 (theory=6.46).

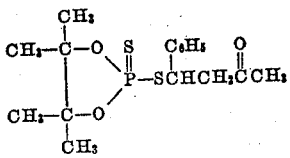

Example 5

To 72 grams (0.3 mol) of 5-ethyl-2-mercapto-4-propyl-2-thiono-1,3,2-dioxaphosphorinane held at 42°–50° C. there were added during 20 minutes dropwise 98 grams (1 mol) of mesityl oxide. After another 2 hours agitation at 25° C., the reaction mixture was neutralized, washed with water and stripped by distillation in the manner described in Example 2, yielding a residue product that was dissolved in 300 cc. of ethyl ether, neutralized with dilute aqueous sodium bicarbonate, washed with water, dried over calcium sulfate, filtered, and the filtrate stripped by distillation to a kettle temperature of 50° C. under less than 4 mm. of mercury pressure. The brown liquid residue, 2-(2-acetyl-1,1-dimethylethylmercapto) - 5 - ethyl - 4 - propyl - 2 - thiono - 1,3,2 - dioxaphosphorinane, had the following properties: molecular weight (ebullioscopic)=328.4 (338.5); acidity=0.001 cc. of N KOH/gram; salt=nil; $n_D^{30}$=1.5243; analysis, percent by weight: P=8.86 (theory=9.15); S=18.60 (theory=18.94); C=49.42 (theory=49.67); H=7.90 (theory=8.05); percent yield=59 (based upon the phosphorus-containing reactant).

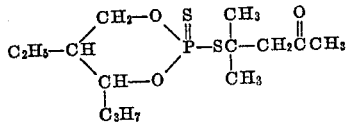

Example 6

To a solution of 64 grams (0.3 mol) of 2-mercapto-2-thiono-4,4,6-trimethyl-1,3,2-dioxaphosphorinane in 100 grams of toluene, maintained at 25°–30° C. there were added dropwise during 20 minutes 98 grams (1 mol) of mesityl oxide. After stirring the mixture 2 additional hours at 25° C. the reaction mixture was neutralized, washed with water and stripped by distillation in the manner described in Example 2. The resultant residue was dissolved in 300 cc. of ethyl ether, washed successively with dilute aqueous sodium bicarbonate and with water, dried over calcium sulfate, and stripped by distillation to a kettle temperature of 50° C. under less than 4 mm. of mercury pressure. The resultant 2-(2-acetyl - 1,1 - dimethylethylmercapto) - 2 - thiono - 4,4,6-trimethyl-1,3,2-dioxaphosphorinane was recovered in 40% yield as a brown liquid residue with the following properties: $n_D^{30}$=1.5304; acidity=0.03 cc. of N KOH/gram; analysis, percent by weight: P=9.78 (theory=9.98); S=19.9 (theory=20.66); C=45.59 (theory=46.43); H=7.13 (theory=7.46).

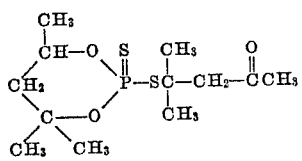

Example 7

During 20 minutes 98 grams (1 mol) of mesityl oxide were fed dropwise to an agitated solution of 68 grams (0.5 mol) of 5,5-diethyl-2-mercapto-2-thiono-1,3,2-dioxaphosphorinane and 200 grams of toluene, maintained at 42°–50° C. After agitation for 2 additional hours at 25° C. the reaction mixture was neutralized with dilute aqueous sodium bicarbonate, washed with water, and stripped by distillation to a kettle temperature of 100° C. under less than 2 mm. of mercury pressure. The solid residue was purified by dissolving in 500 cc. of ethyl ether, neutralizing with dilute aqueous sodium bicarbonate, washing with water, drying, filtering, cooling the filtrate to −20° C., and again filtering. The thus collected residue was redissolved in ethyl ether, and the ether extract was cooled to −20° C. to precipitate the desired product, which was filtered and then dried at 25° C. under less than 4 mm. of mercury pressure, thereby providing 32 grams of 2-(2-acetyl-1,1-dimethylethylmercapto) - 5,5 - diethyl - 2 - thiono - 1,3,2-dioxaphosphorinane as a white solid having the following properties: melting point=65°–70° C.; acidity= 0.008 cc. of N KOH/gram; salt=nil; analysis, percent by weight: P=9.58 (theory=9.55); S=19.10 (theory= 19.76); C=47.88 (theory=48.12); H=7.70 (theory= 7.77).

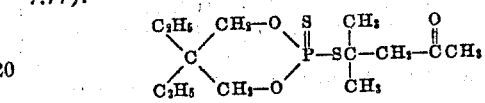

The invention is susceptible of modification within the scope of the appended claims.

I claim:

1. As new compounds keto-esters of heterocyclic dithiophosphoric acids, said esters having structures corresponding to the formula:

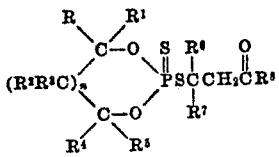

wherein R, R¹, R², R³, R⁴ and R⁵, respectively, designates a member of the class consisting of hydrogen and the lower alkyl radicals; R⁶ and R⁷ respectively, designates a member of the class consisting of the lower alkyl, phenyl, tolyl and benzyl radicals; R⁸ designates a member of the class consisting of the alkyl radicals having 1 to 18 carbon atoms, and the phenyl, tolyl and benzyl radicals and the

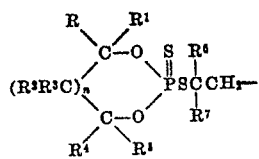

radicals; and n is of the class consisting of 0 and 1.

2. As new compounds, keto-esters of heterocyclic dithiophosphoric acids, said esters having structures corresponding to the formula

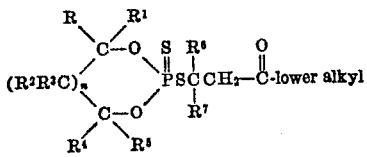

wherein R, R¹, R², R³, R⁴ and R⁵, respectively, designates a member of the class consisting of hydrogen and the lower alkyl radicals; R⁶ and R⁷, respectively, designates a member of the class consisting of the lower alkyl, phenyl, tolyl and benzyl radicals; and n is of the class consisting of 0 and 1.

3. As new compounds, keto-esters of heterocyclic dithiophosphoric acids, said esters having structures corresponding to the formula

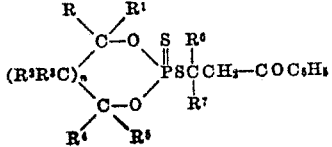

wherein R, R¹, R², R³, R⁴ and R⁵, respectively, designates a member of the class consisting of hydrogen and the lower alkyl radicals; R⁶ and R⁷, respectively, designates a member of the class consisting of the lower alkyl, phenyl, tolyl and benzyl radicals; and $n$ is of the class consisting of 0 and 1.

4. Process for producing keto-esters of heterocyclic dithiophosphoric acids containing phosphorus in the heterocyclic ring, which comprises reacting a heterocyclic dithiophosphoric acid of the formula

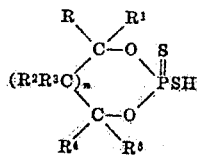

wherein R, R¹, R², R³, R⁴ and R⁵, respectively, designates a member of the class consisting of hydrogen and the lower alkyl radicals; and $n$ is of the class consisting of 0 and 1; with an unsaturated ketone of the structure

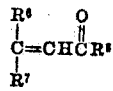

wherein R⁶ and R⁷, respectively, designates a member of the class consisting of hydrogen and the lower alkyl, phenyl, tolyl and benzyl radicals; and R⁸ designates a member of the class consisting of the alkyl radicals having 1 to 18 carbon atoms, and the phenyl, tolyl, benzyl, vinyl, β-mono-lower alkylvinyl and β,β'-di-lower alkylvinyl radicals, at a temperature within the range between about —20° C. and about 150° C., and recovering from the resultant reaction mixture the keto-ester of a heterocyclic dithiophosphoric acid thus produced.

5. 2-(2-acetyl-1,1-dimethylethylmercapto) - 5 - ethyl-4-propyl-2-thiono-1,3,2-dioxaphosphorinane.

6. 2-(2-acetyl-1,1-dimethylethylmercapto) - 2 - thiono-4,4,6-trimethyl-1,3,2-dioxaphosphorinane.

References Cited in the file of this patent
UNITED STATES PATENTS
2,632,020   Hoegberg _____ Mar. 17, 1953